(No Model.) 4 Sheets—Sheet 1.
J. S. MITCHELL.
DIE FOR MANUFACTURING HAMES.
No. 324,951. Patented Aug. 25, 1885.
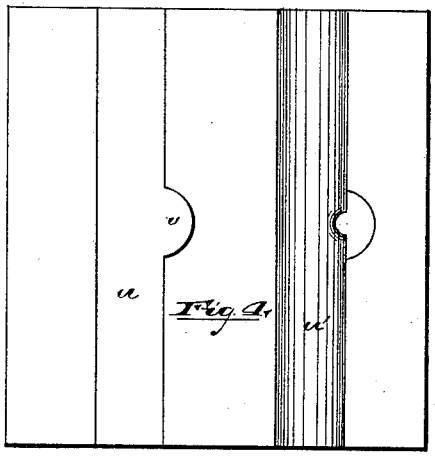
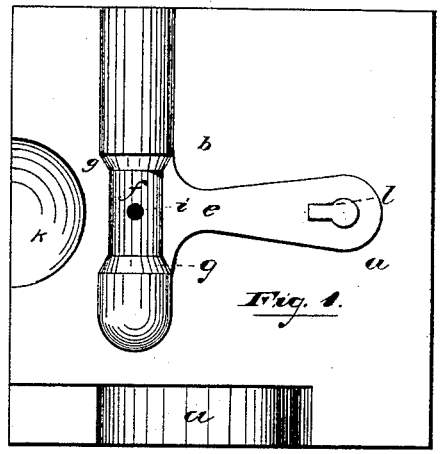
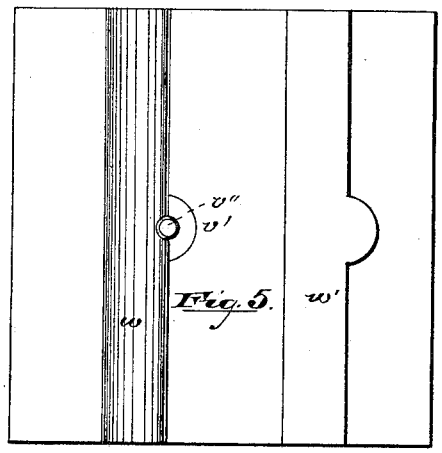
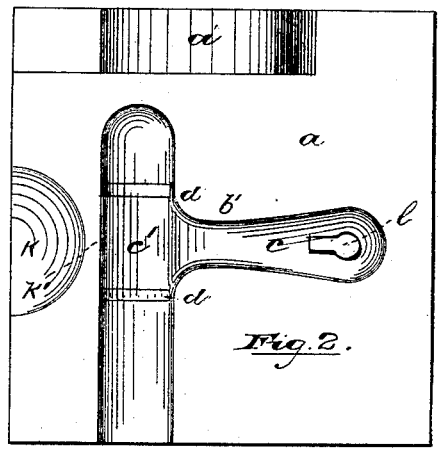
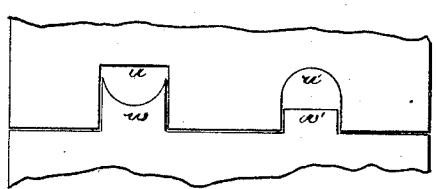
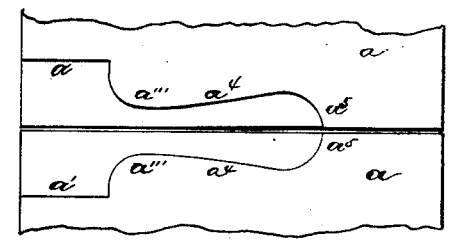
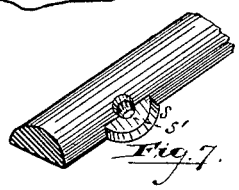
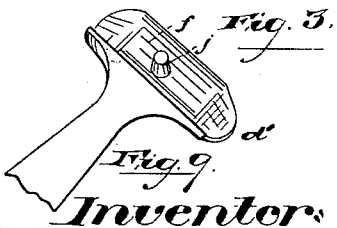
Attest:
Fredk F. Campbell
B. L. McNulty
Inventor:
John S. Mitchell,
By Drake & Co.
attys.

(No Model.) 4 Sheets—Sheet 2.
J. S. MITCHELL.
DIE FOR MANUFACTURING HAMES.
No. 324,951. Patented Aug. 25, 1885.
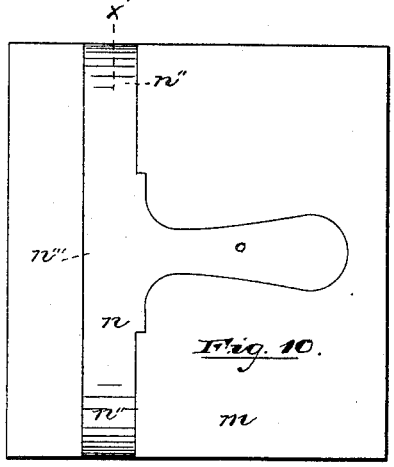
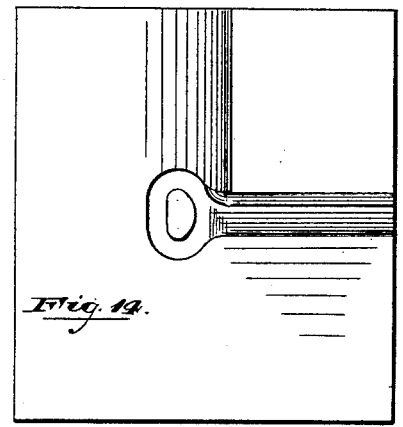
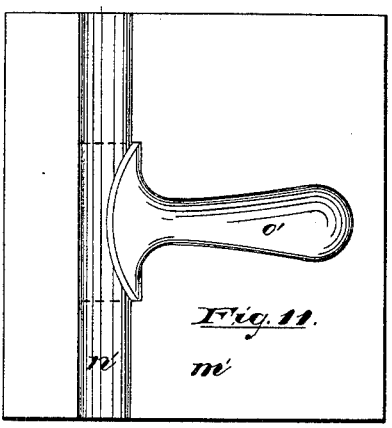
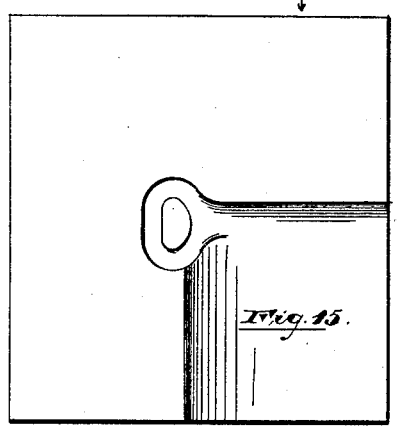
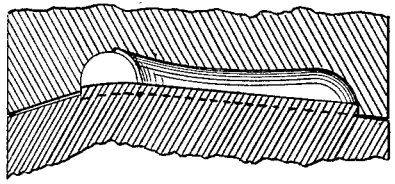
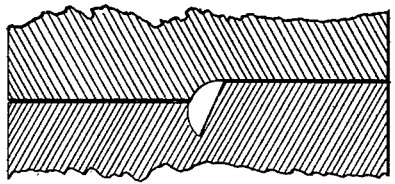
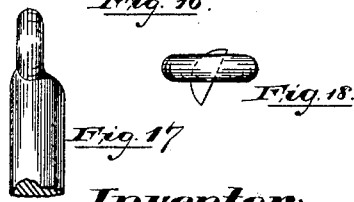
Attest:
Fredk. H. Campbell.
Oscar A. Michel.
Inventor:
John S. Mitchell,
by Drake & Co.
attys.

(No Model.) 4 Sheets—Sheet 3.

J. S. MITCHELL.
DIE FOR MANUFACTURING HAMES.

No. 324,951. Patented Aug. 25, 1885.

Attest: Frdk. F. Campbell. B. J. McNulty.

Inventor: John S. Mitchell, by Drake & Co. Attys (No Model.) 4 Sheets—Sheet 4.
J. S. MITCHELL.
DIE FOR MANUFACTURING HAMES.

No. 324,951. Patented Aug. 25, 1885.

Attest: Frdk. F. Campbell
B. L. McNulty.

Inventor: John S. Mitchell,
by Drake & Co.
attys.

UNITED STATES PATENT OFFICE.

JOHN S. MITCHELL, OF MILFORD, CONNECTICUT.

DIE FOR MANUFACTURING HAMES.

SPECIFICATION forming part of Letters Patent No. 324,951, dated August 25, 1885.

Application filed April 27, 1885. (No model.)

*To all whom it may concern:*

Be it known that I, JOHN S. MITCHELL, a citizen of the United States, residing at Milford, in the county of New Haven and State of Connecticut, have invented certain new and useful Improvements in Dies for Manufacturing Hames; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the operation of manufacturing hames, and thereby reduce the cost of the same, and to secure a more durable, uniform, and finished article.

The invention consists in the arrangements and combinations of parts, substantially as will be hereinafter embodied in the clauses of the claim.

Figure 19:
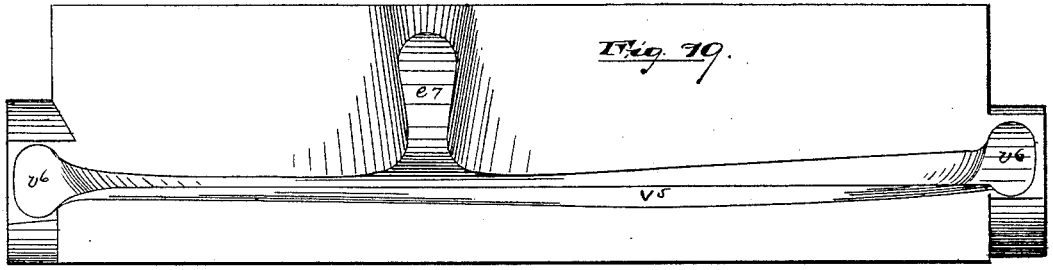
Figure 20:
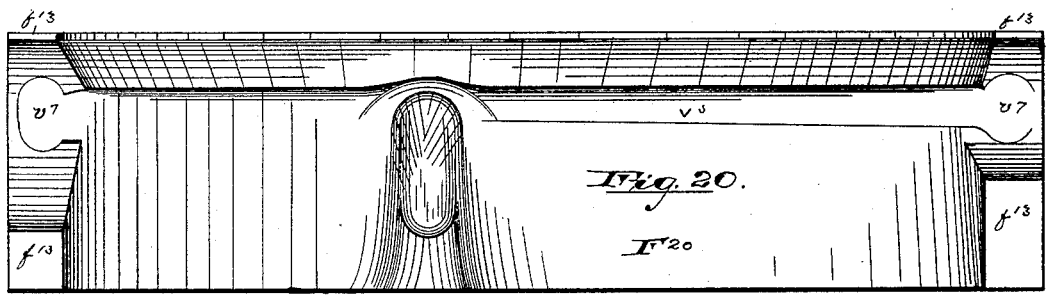
Figure 21:
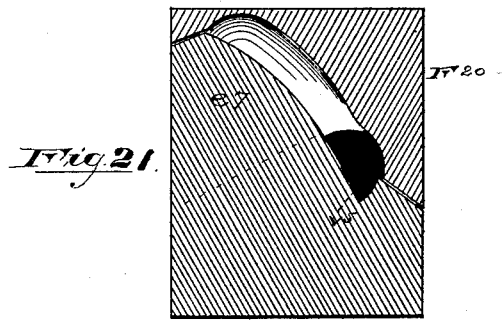
Figure 22:
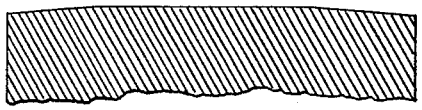
Figure 23:
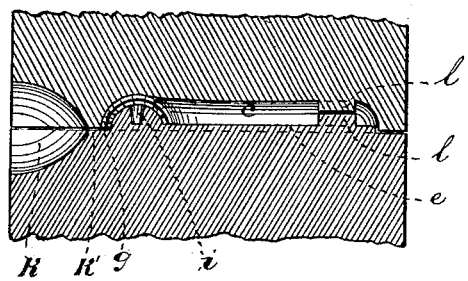

Referring to the accompanying drawings, in which like letters of reference indicate corresponding parts in each of the several figures, Figures 1 and 2 are plans of dies for forming the draft-eye; and Fig. 3 is a side elevation of the same, showing means for "breaking down" the metal bar to give it a shape approximating that of the draft-eye. Figs. 4 and 5 are plans, and Fig. 6 a side view, of dies for forming an offset or brace on the hame, as shown in Fig. 7, where the terret is secured; and Figs. 8 and 9 illustrate the draft-eye resulting from the use of said draft-eye dies, Fig. 8 being a longitudinal section taken through the "apron" of said draft-eye. Figs. 10 and 11 are plans of dies for welding the draft-eye to the hame, and Fig. 12 is a sectional view of the same, taken through line $x$, Fig. 11; and Fig. 13 is a sectional view of the hame and draft-eye. Figs. 14, 15, and 16 illustrate in section dies for twisting the end eyes of the hame in the manner illustrated by Figs. 17 and 18. Figs. 19, 20, 21 illustrate dies for bending the hame longitudinally. Fig. 22 is a sectional view taken through line $x$, Fig. 10; and Fig. 23 is a sectional view showing the dies illustrated in Figs. 1 and 2 in engagement, the section-lines being taken longitudinally through the center of the parts for forming the draft lug or eye.

In carrying out the invention I form the draft-eye of the hame by first breaking down or forming the end of a bar into a shape approximating that of the draft-eye. This is done by means of dies $a$, Figs. 1, 2, 3, having broad recess $a'\ a'$ at the edge to receive the bar $a''$, indicated in outline, rounded projections $a'''$, to form the shank of the draft-eye, the edges of which projections recede, as at $a^4$, from the face of the dies to form the wide end of the draft-eye, and then return, as at $a^5\ a^5$, toward said face to give the rounded end. For convenience the breaking-down dies are in the same die-plates with those next described for cutting off the draft-eye and giving it shape. After the bar is broken down, as described, it is inserted in the second set of dies or swaging parts, $b\ b'$. These dies are of peculiar construction, the bottom die having a recess, $c$, of the general shape but deeper than the thickness of the desired draft-eye, a recess, $c'$, to form the apron for engaging the rounded face of the hame, and inclines $d$, to give the opposite ends of the apron beveled edges or to form scarfs $d'$, as shown in Fig. 9.

The upper die, $b$, to co-operate with the die $b'$, has a raised platform, $e$, conforming in outline to the bottom of the draft-eye and adapted to enter and partly fill the recess $c$. At the base of this platform is a ridge, $f$, running at right angles on the die-plate to the platform, which forms the grooved or concaved inner face, $f'$, of the apron. Said rounded ridge expands, as at $g$, to co-operate with the incline $d$ in forming the scarf at the ends of the apron. The ridge $f$ is perforated, recessed, or bored out at a point approximately midway between the expansions $g$, as at $i$, to form in the groove of the apron a pin, $j$. Said dies $b\ b$ are recessed, as at $k\ k$, forming cutting-edges $k'$, by means of which the draft-eye is severed from the bar. The raised portion $e$ and recess $c$ are each provided with projections $l$, to strike out the eye or clip-perforation of the draft-eye.

It will be observed in viewing sectional Fig. 12, Sheet 2, that the shaping or swaging portion of the upper or male die, $b$, projects from the face of the die-plate and fits into the recess of the lower or female die. This is done to confine the metal, so that it is prevented from spreading and forming a "flask," which would necessitate a subsequent operation of trimming. I am also enabled to employ lighter stock, the whole of which is at once utilized in forming the draft-eye.

The draft-eye being formed, I provide dies $m\ m'$, Figs. 10, 11, 12. These have transverse swaging parts $n\ n'$, corresponding in shape to the hame-body, and parts $o\ o'$, lying at right angles thereto, to operate on the hame draft-eye. In the upper or male die the swaging parts project from the surface of the plate, as in Fig. 12, the ends $n''$ of the transverse portion $n$ being slightly beveled, as shown more clearly in sectional Fig. 22, as also is the longitudinal edge $n'''$, so that a recess will be formed on the under or flat side of the hame, whereby the hame is made to conform more closely to the shape of the collar. The projection formed by said bevels $n''\ n'''$ brings the pressure to bear on the joint between the hame and draft-eye, thus making a more perfect weld.

The dies being in position, the hame, which has been perforated to receive the pin $j$, and draft-eye are placed together, heated to a welding heat, and then laid in their respective grooves in the female die and acted on by the male die. The scarfs formed at the ends of the apron so spread the joint between the parts as that the point or line of union is not observable in the finished hame. Said joint being at right angles to the line of the hame, the same is easily finished on an emery-wheel without the use of files.

If desired, the dies may be formed to forge the apron into a different pattern to suit the desired style; for example, (see Fig. 11,) the die may be shaped to form an anchor apron, the actual joint between the parts being, however, at the point indicated by dotted lines extending across the hame.

To form a brace or offset, $s$, Fig. 7, on the hame where it receives the terret, I form on the face of the dies, Figs. 4 and 5, parts $u$ and $w$, the first being a deep transverse groove which is flat at the bottom, and has a recess, $v$, in the side walls thereof, which extends down so that its bottom lies even with that of the groove, so that the back of the offset will lie flush with that of the hame-body.

To engage the deeply-grooved die I provide the co-operating die, Fig. 5, with the projecting ridge $w$, corresponding laterally in shape with the groove $u$, but not as deep, to form in said groove a chamber to receive the hame-body. The face of the ridge is concaved, as shown, to form a rounded face on the hame-body, and is provided with a lateral projection, $v'$, to engage the recess $v$ and form therewith the offset $s$, the said projection not being as deep as the recess, forming a lateral chamber between, of the shape of the offset, and into which the metal is forced, as will be understood.

The dies are provided with pintles $v''$, which form an eye, $s\ s'$, in the offset, as shown.

I may reverse the shapes described in the manner illustrated by parts $u'\ w'$, in which the ridge $w'$ is flat on the face to engage the bottom of the hame, and the bottom of the groove is rounded to form the rounded face of the hame.

The parts of the hame being formed and welded together in the manner described, the said hame is placed in bending-dies, (illustrated in Figs. 19, 20, 21,) to give the hame the general shape shown in patent granted to me July 1, 1884, No. 301,256. The male die, Fig. 19, is provided with a V-shaped groove, $v^5$, extending longitudinally along the curved face of the die to receive the inner angular edge (or the edge lying adjacent to the "roll" of the collar) of the hame, and hold said hame up edgewise, the draft-eye projecting upward from the die in an inclined position. At the ends of the die the groove is expanded, as shown at $v^6\ v^6$, to receive the end eyes and twist them so that the planes of said eyes lie at an angle to the plane of the back of the hame, as indicated in Figs. 17, 18. At about the center of the die the same is provided with an extension, $e^7$, the face of which extends upward from one of the sides of the V-shaped grooves and bends backward, as shown in Fig. 21, to give to the draft-eye a curved shape, shown in the patent above referred to.

The female die $F^{20}$, Figs. 20, 21, is provided, also, with a longitudinal recess to receive the hame-body, and a deep upward recess to receive the extension $e^7$. At the ends of said die are forks $f^{13}\ f^{13}$, between which the end eyes of the hame are caught and held in position while the straight hame is bent over the curved (convexed) surface of the male die. The said ends are also provided with broadened bearings $v^7$ between said forks or prongs to co-operate with those marked $v^6$ to give the peculiar twist to the end eyes.

Having thus described the invention, what I claim as new is—

1. In combination, the dies for breaking down a bar to secure the shape of a draft-eye at the ends thereof, having the broader recesses $a'$ at the edge thereof, the rounded projections $a'''$, the receding edges $a^4$, and the curved returned edges $a^5$, substantially as and for the purposes set forth.

2. The combination of the dies herein shown and described, for forming a draft-eye and apron, comprising the die having the recess $c$ and projection $l$ near the end thereof, the transverse recess $c'$, with the inclines $d\ d$, and the die having the ridge $f$ and inclines $g\ g$, substantially as shown and described.

3. In combination, the die having a draft-eye recess, $c$, with a lug or projection for forcing out the clip-eye at one end thereof, an apron-recess, $c'$, lying transversely across the end of said recess $c$, having inclines $d\ d$, for forming scarfs $d'$ at the opposite ends thereof, and a die having the raised platform conforming in shape to the bottom of the draft-eye and adapted to partly fill the recess $c$, and having at the base of said platform, running at right angles thereto, a ridge, $f$, to form the concaved under side of the apron, substantially as set forth.

4. In combination, the die having a draft-eye recess, $c$, with a lug or projection for forcing out the clip-eye at one end thereof, an apron-recess, $c'$, lying transversely across the end of said recess $c$, having inclines $d\ d$, for forming scarfs $d'$ at the opposite end thereof, and a die having a raised ridge for forming the concaved under side of the apron, said ridge being bored, as at $i$, to form the pin $j$, and expanded, as at $g$, to co-operate with inclines $d\ d$ in forming the scarfs, said parts being arranged and operating substantially as set forth.

5. Hame-bending dies having the longitudinal groove $v^5$, bearing for the draft-eye $e^7$, and the co-operating die having forks at each end to receive the ends of the other die and bend the hame over the curved face of the coacting die.

6. The die having the longitudinal groove $v^5$, bearings $v^7$ at the ends of said groove for the end eyes, and a raised finger or bearing for the draft-eye, in combination with a co-operating die having forks to receive the ends of the hame, substantially as set forth.

In testimony that I claim the foregoing I have hereunto set my hand this 25th day of February, 1885.

JOHN S. MITCHELL.

Witnesses:
CHARLES H. PELL,
FREDK. F. CAMPBELL.